(12) United States Patent
Saberi et al.

(10) Patent No.: US 7,636,678 B2
(45) Date of Patent: Dec. 22, 2009

(54) SYSTEMS AND METHODS THAT FACILITATE MAXIMIZING REVENUE FOR MULTI-UNIT AUCTIONS WITH PRIVATE BUDGETS

(75) Inventors: Amin Saberi, Palo Alto, CA (US); Christian H. Borgs, Seattle, WA (US); Jennifer T. Chayes, Seattle, WA (US); Mohammad Mahdian, Bellevue, WA (US); Nicole S. Immorlica, Mont Vernon, NH (US)

(73) Assignee: Microsoft Corporation, Redmond, WA (US)

( * ) Notice: Subject to any disclaimer, the term of this patent is extended or adjusted under 35 U.S.C. 154(b) by 648 days.

(21) Appl. No.: 11/107,523

(22) Filed: Apr. 15, 2005

(65) Prior Publication Data

US 2006/0136320 A1 Jun. 22, 2006

Related U.S. Application Data

(60) Provisional application No. 60/636,848, filed on Dec. 16, 2004.

(51) Int. Cl.
*G06Q 40/00* (2006.01)
(52) U.S. Cl. .................................................. 705/35
(58) Field of Classification Search ............. 705/10–45, 705/400; 713/2, 13; 725/35; 235/375; 283/115; 370/667; 379/242
See application file for complete search history.

(56) References Cited

U.S. PATENT DOCUMENTS

| | | | |
|---|---|---|---|
| 5,629,980 A * | 5/1997 | Stefik et al. ................... 705/54 |
| 5,634,012 A * | 5/1997 | Stefik et al. ................... 705/39 |
| 6,985,885 B1 * | 1/2006 | Goldberg et al. .............. 705/37 |
| 7,346,571 B1 * | 3/2008 | Fujita ........................... 705/37 |
| 2002/0032621 A1 * | 3/2002 | Smith et al. ................... 705/27 |
| 2003/0018539 A1 * | 1/2003 | La Poutre et al. ............. 705/26 |
| 2003/0163410 A1 * | 8/2003 | Byde et al. ..................... 705/37 |
| 2003/0195835 A1 * | 10/2003 | Sandholm et al. ............. 705/37 |
| 2005/0015328 A1 * | 1/2005 | Zhu et al. ...................... 705/37 |
| 2005/0289043 A1 * | 12/2005 | Maudlin ....................... 705/37 |
| 2006/0047608 A1 * | 3/2006 | Davis et al. ................. 705/400 |
| 2007/0011080 A1 * | 1/2007 | Jain et al. ...................... 705/37 |
| 2007/0124229 A1 * | 5/2007 | Ku et al. ....................... 705/37 |

OTHER PUBLICATIONS

Future world oil prices and production levels: a comment, Wirl, Franz, Energy Journal, v11, n3, p. 131(6), Jul. 1990.*

* cited by examiner

*Primary Examiner*—Mary Cheung
*Assistant Examiner*—Tien C Nguyen
(74) *Attorney, Agent, or Firm*—Lee & Hayes, PLLC

(57) ABSTRACT

The subject invention relates to systems and methods that provide a truthful incentive-compatible mechanism for budget-constrained bidders in order to facilitate asymptotically maximizing revenue with multi-unit auctions in which individual bidders have private valuation per item (e.g., bids, offer prices, utility . . . ) and overall budgets. The systems and/or methods obtain bidder private bids and budget constraint, and separate this information into groups of bids and budgets. Each group is randomly reordered and utilized to determine a profit maximizing price as a function of the bids and budgets within that group. The groups of bids and budgets and the profit maximizing prices are utilized to allocate the auctioned items to respective bidders such that the allocation is based at least in part on the bids, budgets and prices. The systems and methods can be utilized to improve online auctioning.

13 Claims, 11 Drawing Sheets

SYSTEMS AND METHODS THAT FACILITATE MAXIMIZING REVENUE FOR MULTI-UNIT AUCTIONS WITH PRIVATE BUDGETS

CROSS-REFERENCE TO RELATED APPLICATION(S)

This application claims the benefit of U.S. Provisional Patent Application Ser. No. 60/636,848, filed on Dec. 16, 2004, and entitled "Revenue-Maximizing Algorithm for Multi-Unit Auctions with Private Budgets," the entirety of which is incorporated herein by reference.

TECHNICAL FIELD

The subject invention generally relates to auctions, and more particularly to systems and methods that facilitate maximizing revenue in multi-unit auctions in which individual bidders have private valuation per item and overall budgets.

BACKGROUND OF THE INVENTION

An auction generally is the process of buying and selling items by offering them up for bid, taking bids, and then selling the item to the highest bidder, wherein a bid is a price offered for the auctioned item by a potential buyer(s), or bidder(s). In economic theory, an auction can also refer to a method for determining the value of an item (e.g., a commodity, a good, a service . . . ) that has an undetermined or variable price. Auctions typically are classified by type. For example, an auction can be deemed as an English auction, a Dutch auction, a sealed first-price auction, a silent auction, a procurement auction, and a sealed second-price auction. In an English auction, participants (or bidders) bid openly against one another, with each new bid being higher than the previous bid. The auction ends when no participant is willing to bid further (or higher), or when a pre-determined "buy-out" price is reached, at which point the highest bidder wins the auction and pays the bid price. In some instances, the seller may set a "reserve" price, and if the auctioneer fails to raise a bid higher than this reserve a sale may not occur. Even when there is no sale (e.g., because no bid reached the reserve price) the seller may still have to pay a fee to the auctioneer.

In a traditional Dutch auction, the auctioneer begins with a high asking price, which is then lowered until some participant is willing to accept the auctioneer's price, or a predetermined minimum price is reached. The bidder accepting the auctioneer's asking price pays that price for the item. This type of Dutch auction is also referred to as a Chinese auction. The term Dutch auction is also commonly utilized to describe online auctions where several identical goods are sold simultaneously to an equal number of high bidders. In a sealed first-price auction, all bidders simultaneously submit private bids, wherein the winning bid is the highest bid, and the winning bidder pays the price submitted for the auctioned item. Bidders in a traditional Dutch auction and a sealed first-price auction typically underbid what they believe the item is truly worth in hopes of getting the item for less. In a silent auction, participants submit bids not necessarily knowing how many other people are bidding or how much the other participants are bidding. The highest bidder wins the auctioned item and pays the price submitted for the item. In a procurement auction, the roles of a seller and a buyer are reversed. The buyer(s) submits a request for a given item, and one or more providers of that item offer progressively lower prices, wherein the provider that offers the lowest price procures the buyer's business.

In a sealed second-price auction (e.g., a Vickrey auction), all bidders simultaneously submit private bids, wherein the winning bid is the highest bid, but the winning bidder pays the second highest bid rather than his own. When more than one identical item is sold, there are two common generalizations of the second-price auction. In a uniform-price auction, all of the winning bidders pay the price submitted by the highest non-winning bidder. Bidders typically will not bid their true value in a uniform-price auction with multiple units. Where identical items are individually auctioned, once an item has been priced, the winning bidder typically is entitled to buy the remaining goods at the same price. Items the winning bidder decides not to purchase are then auctioned again, typically at a lower price. Some bidders may hold back on bidding since later items will commonly be less expensive. However, they risk the opportunity to purchase the item since there may not be another auction, for example, where all items are successfully sold during the initial auction or the seller is not willing to lower the item's price.

An online auction is an auction where participants bid for products and services over the Internet. In the context of electronic commerce (e-commerce), there is a great deal of interest in multi-item auctions of relatively low-value goods to bidders with budget constraints. An example of such an auction is an auction of online advertisements for search terms and content pages associated with search engines. It is widely believed that advertising will be the principal business model for online activity, and that budget-constrained auctions will be the primary means of realizing that revenue stream.

Conventionally, auctions with budget constraints have been considered in the context of privatization of high-value public goods, such as auctions of telecommunications bands. However, the theoretical framework of budget-constrained auctions is substantially less developed than that of unconstrained auctions. This is unsatisfactory both from a theoretical viewpoint and from a practical viewpoint, where the absence of an appropriate framework leads to losses in revenue and efficiency. In addition, many conventional approaches utilized in the economics community are confined to a single-item, a single bidder and/or a flexible budget constraint. For example, one approach contemplates a single-item with multiple bidders and a flexible budget constraints scenario in order to model an efficient redistribution of public goods to the private sector. Other approaches address Bayesian equilibria of auctions with budget constraints and propose all-pay auctions, which, in general, are not suitable mechanisms for online advertisement auctions. In light of the above-noted deficiencies and constraints associated with conventional online auctions, there is a need to improve auctioning techniques to facilitate generating greater revenue for online auctioning.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The systems and methods of the subject invention provide a truthful (as described in detail in Appendix A below) incentive-compatible mechanism for budget-constrained bidders in order to facilitate maximizing revenue with multi-unit auctions in which individual bidders have private valuation per item (e.g., bids, offer prices, utility . . . ) and overall budgets. Such bidders typically have fixed budgets such that budget constraints cannot be exceeded or else the bidder's total utility becomes unbounded. The foregoing is achieved through constructing an incentive-compatible mechanism that asymptotically achieves revenue maximization. Unlike conventional techniques, this novel approach utilizes a private valuation and a private fixed budget, and the corresponding utility function is not constrained to be quasi-linear. In addition, many conventional techniques are restricted to item allocation to one item per bidder, whereas the subject invention contemplates allocating essentially any number (e.g., zero, one, and more than one) of items to any number of bidders. The foregoing novel systems and methods can be utilized to improve online auctioning.

In one aspect of the invention, systems and/or methods that facilitate allocating one or more auctioned items to one or more bidders are provided. The systems and/or methods employ an item allocation component, which can accept bidder information for one or more particular items being auctioned. The bidder information can include, for instance, one or more randomly ordered lists of bidders' private bids and associated budget constraints. In addition, the item allocation component can accept price information, including one or more prices computed to maximize profits for particular auctioned items. The item allocation component can utilize the bidder information and the profit maximizing prices to allocate the auctioned items to the bidders. The systems and/or methods can further employ a price component, which computes the profit maximizing prices as a function of the bidder information. The price component conveys these computed prices to the allocation component. The systems and/or methods can further invoke a partition component, which packages (or groups, aggregates, etc.) bidder information that can be utilized by the price component and the item allocation component. The partition component can obtain bidders' private bids for one or more items and the bidders' private budgets (which can be fixed) and create one or more groups of bids and budgets from an initial set of bidders' bids and budgets. The partition component can convey these groupings to the price component (e.g., for computing the profit maximizing prices) and the allocation component (e.g., for allocating items to bidders).

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DESCRIPTION OF THE INVENTION

Figure 1:
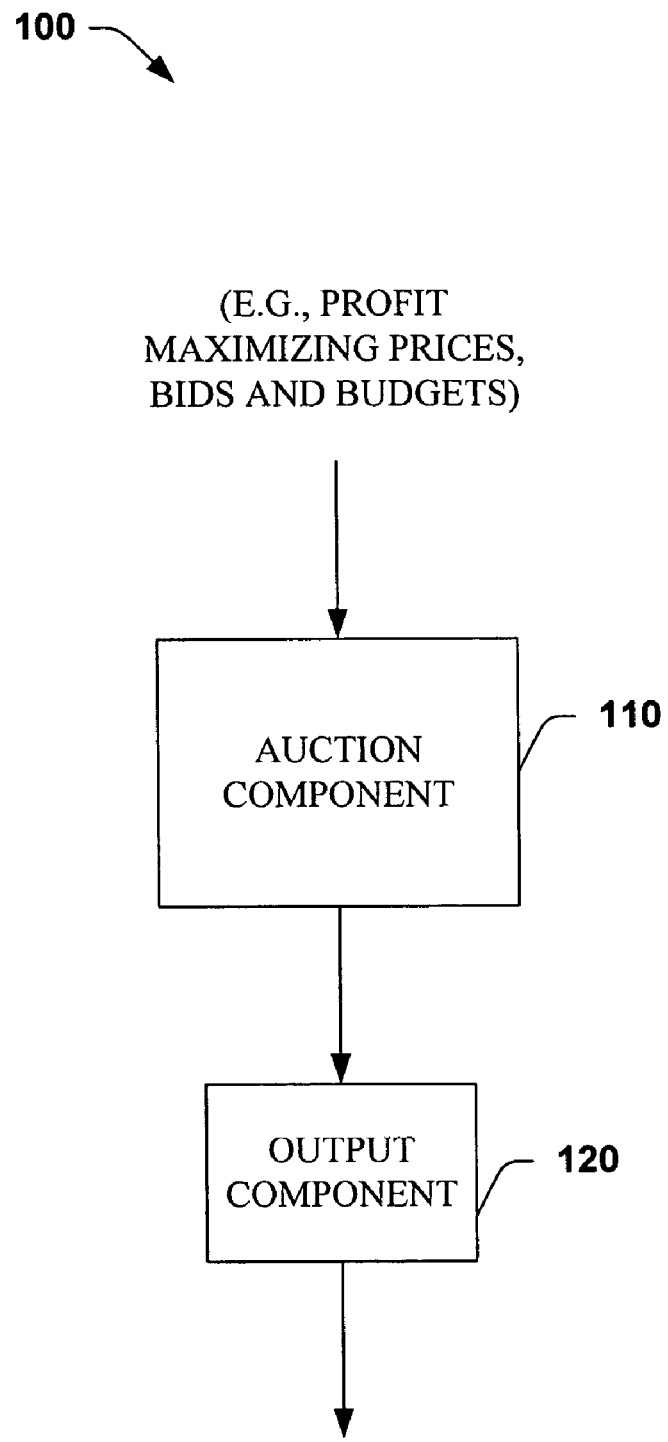
FIG. 1 illustrates an exemplary system that allocates auctioned items to one or more bidders based at least in part on maximizing revenue.

The subject invention relates to systems and methods that provide a truthful incentive-compatible mechanism for bidders with private valuation and private fixed budgets in order to facilitate maximizing revenue with multi-unit auctions. The mechanism utilizes a budget dominance parameter, which is defined to be the maximum budget of any single bidder divided by the optimal, omniscient revenue, and a competitive ratio, which is defined to be the ratio of the optimal revenue to the revenue determined by the mechanism. Utilizing this parameter and competitive ratio, an incentive-compatible mechanism for an m-item, n-bidder auction can be generated, wherein the competitive ratio approaches one as the budget dominance parameter approaches zero.

Terms such as "component" and variations thereof are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program, a computer, and an industrial controller. By way of illustration, both an application running on a server and the server can be components. One or more components may reside within a process and/or thread of execution and a component may be localized on one computer and/or distributed between two or more computers (e.g., via data packets and signals between the computers), industrial controllers, and/or modules communicating therewith.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

FIG. 1 illustrates a system 100 that allocates auctioned items based at least in part on maximizing revenue in a multi-unit auction. The system 100 includes an auction component 110 that can receive bidder information associated with one or more bidders for one or more items being auctioned. This bidder information can include, for example, a bidder's private bid and budget for each item the bidder has bid on. As described in detail below, the information can be aggregated in a random order and/or generated from a randomly ordered list of bidders and their respective bids and budgets. The auction component 110 can also receive price information. As described in detail below, the price information can be a price determined to maximize profit for each item being auctioned. This price can be computed as a function the bidders' bid and budget information. Utilizing the bidders' bid and budget information and the profit maximizing price, the auction component 110 can allocate the auctioned items to the bidders such that revenue is maximized.

The auction component 110 can be utilized to construct a truthful incentive-compatible mechanism for budget-constrained bidders that facilitates asymptotically maximizing revenue with multi-unit auctions in which individual bidders have private valuation per item (e.g., bids, offer prices, utility . . . ) and overall budgets. Unlike conventional techniques, this novel approach utilizes bidder private valuations and private fixed budgets, and corresponding utility functions are not constrained to be quasi-linear. For instance, a utility function can be linear, quasi-linear and/or non-linear. In addition, many conventional techniques are restricted to item allocation to one item per bidder, whereas the subject invention contemplates allocating essentially any number (e.g., zero, one, and more than one) of items to any number of bidders.

The output component 120 provides a mechanism to convey the allocation decision to other components. For example, the system 100 can be employed in connection with an online auction, wherein the output component 120 can include various adapters, connectors, channels, protocols, etc. for dynamic and seamless execution with the online auction service and/or components associated therewith. For instance, the output component 120 can be utilized as an interface between the system 100 and other components and/or as a component that facilitates presenting auction results to bidders. Although depicted as an entity separate from the auction component 110, it is to be understood that the output component 120 can be incorporated into the auction component 110 and/or any component associated therewith.

Figure 2:
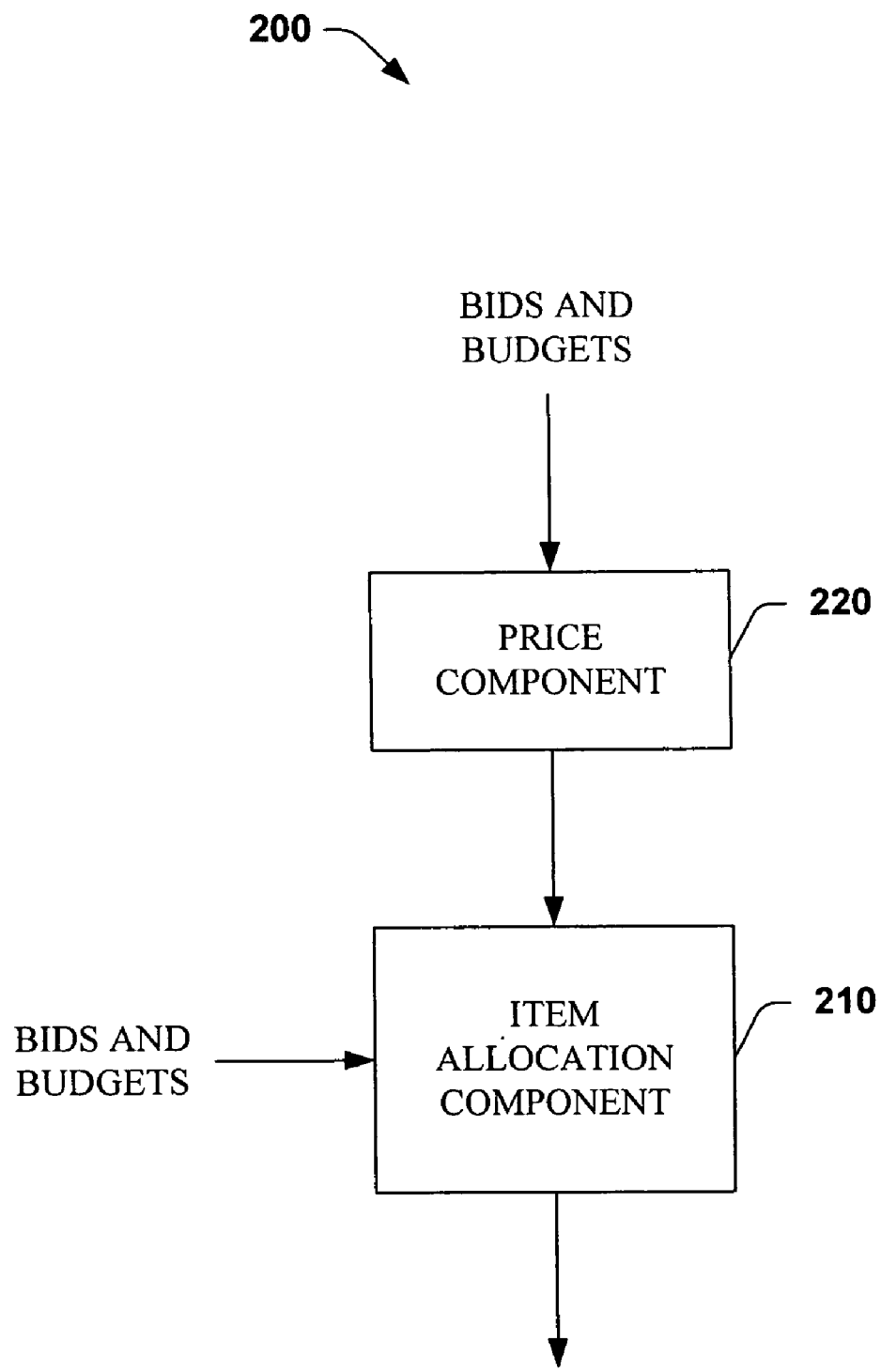
FIG. 2 illustrates an exemplary system that computes and utilizes a maxim revenue price to facilitate allocating one or more auctioned items as a function of bidder bids and budgets.

FIG. 2 illustrates a system 200 that computes and utilizes maximum revenue prices to facilitate allocating one or more auctioned items to one or more bidders in a multi-unit auction. The system 200 includes an item allocation component 210, which can accept bidder information for one or more particular items being auctioned. As described above, the bidder information can include, for example, one or more lists of bidders' private bids and associated budget constraints. The bids and budgets within the one or more lists can be randomly ordered and/or generated from a randomly ordered list that includes information for all the bidders submitting bids. The item allocation component 210 can also receive price information, which can include one or more prices computed to maximize profits for particular auctioned items. The profit maximizing prices can be computed by a price component 220, which conveys this data to the allocation component 210. The price component 220 can determine the profit maximizing price based at least in part on the bidders' bids and the budgets. Upon receiving the bids and budgets and the profit maximizing prices, the item allocation component 210 can allocate the auctioned items to the bidders. The foregoing provides novel improvements over conventional systems by asymptotically maximizing revenue with multi-unit auctions, wherein respective bidders are associated with private valuations and private fixed budgets and multiple items can be allocated to multiple bidders.

Figure 3:
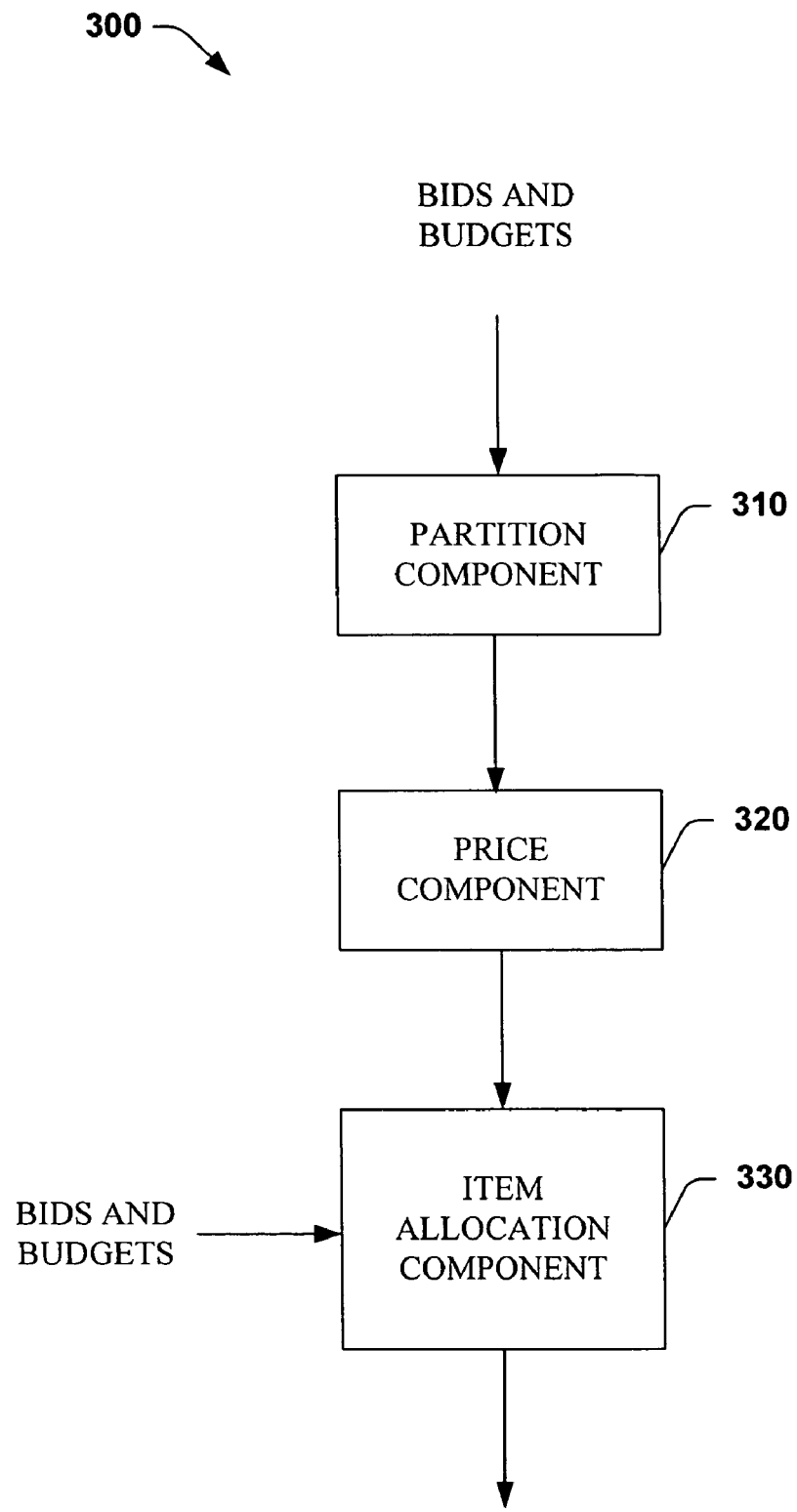
FIG. 3 illustrates an exemplary system that generates information that is employed to determine a maxim revenue price that facilitates allocating one or more auctioned items in a multi-unit auction.

FIG. 3 illustrates a system 300 that generates information that is employed to determine maximum revenue prices that facilitate allocating one or more auctioned items in a multi-unit auction. The system 300 includes a partition component 310, which packages (or groups, aggregates, etc.) bidder information that is utilized by a price component 320 to compute profit maximizing prices, and an item allocation component 330 that allocates auctioned items to one or more bidders based at least in part on the profit maximizing prices and the bidder information. The partition component 310 can obtain one or more bidder private bids for one or more items and the bidder's private budgets (which can be fixed). It is to be appreciated that the order in which the one or more private bids and budgets are received by the partition component 310 can be random, ascending (e.g., based on relative magnitude, time received, bidder characteristics . . . ), descending (e.g., based on relative magnitude, time received, bidder characteristics . . . ), etc. In addition, various algorithms can be utilized to affect the ordering. For example, a uniform or Gaussian algorithm or an algorithm based on another distribution can be utilized to generate a randomly ordered list of bids and budgets.

The partition component 310 can create one or more groups of bids and budgets from an initial set of bidders' bids and budgets. For example, the partition component 310 can split the initial set into two equally sized groups (or groupings). Such split can include dividing the initial set in half, wherein one half of the initial set is considered one group and the remaining half is considered another group. In another example, more than two groups can be generated and such groups can be unequal in size. In yet another example, a single list can be generated from a subset of the initial set of bids and budgets or the entire initial set. Upon, generating the one or more groups of bids and budgets, the partition component 310 can reorder the bids and budgets within each group. Similar to the initial set, any and/or all generated groups can be reordered utilizing a random (e.g., uniform, Gaussian . . . ) and/or a non-random technique. For instance, bidders can be randomly placed in a group with a probability of one half. It is to be understood that this example is explanatory and does not limit the invention. For example, the initial set of bids and budgets and split into essentially any number of equally or unequally sized groups. Moreover, although the preceding example describes a scenario in which an initial group of bidders, or agents, can be partitioned into two groups, it is to be understood that the systems and methodologies described herein can employ an optimization algorithm that can partition the initial group into more than two (e.g., three, four, ten, fifty, . . . ) groups (e.g., subsets) and/or can be employed to optimize a single group (e.g., the initial group, a single subset of bidders in the initial group, . . . ).

The partition component 310 can provide the one or more groupings of bids and budgets to the price component 320, which can compute profit maximizing prices for auctioned items there from. The profit maximizing prices and the one or more groupings can be conveyed to the item allocation component 330, which can utilize this information to allocate items to bidders associated with the bids and budgets in the one or more groups. For example, where two groups are generated from the initial set, the price component 320 can compute a profit maximizing price for each group. The allocation component 330 can utilize the bids and budgets from one group along with the profit maximizing price of the other group to allocate items to bidders associated with this group.

Likewise, the allocation component 330 can utilize the bids and budgets from the other group along with remaining the profit maximizing prices to allocate items to bidders associated with this group.

Figure 4:
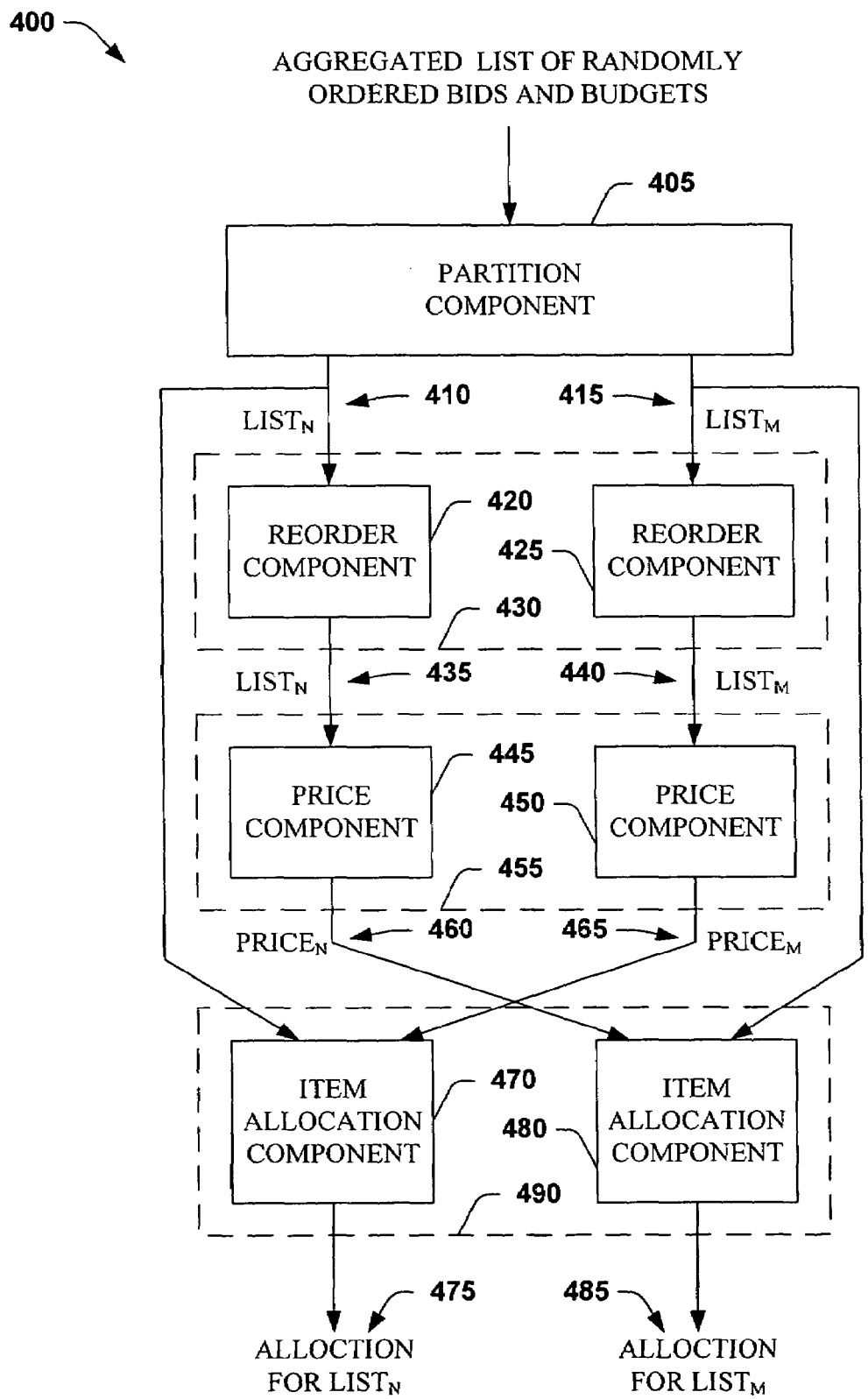
FIG. 4 illustrates an exemplary system that implements a two-list technique that utilizes private bids and budgets to facilitate allocating one or more auctioned items.

FIG. 4 illustrates a system 400 that implements a two-list technique that utilizes private bids and fixed budgets to facilitate allocating one or more auctioned items. The system 400 employs a partition component 405 that receives a randomly ordered (e.g., as described above) aggregation of bids and budgets for one or more auctioned items. The partition component 405 can parse this list into a $list_N$ at 410 and a $list_M$ at 415. As noted above, such lists can include an equal number of bids and budgets, for example, where the aggregated list is split into two equally-sized lists of bids and budgets. The $list_N$ and the $list_M$ can be concurrently and/or serially conveyed to a reorder component 420 and a reorder component 425, respectively. It is to be appreciated that the reorder components 420 and 425 can be separate components, the same component, and/or part of a component 430. The reorder components 420 and 425 can randomly reorder the input lists to render reordered lists, $list_N$ and $list_M$, at 435 and at 440, respectively.

The reordered $list_N$ and $list_M$ are conveyed to a price component 445 and a price component 450, respectively. Similar to the reorder components 420 and 425, the price components 445 and 450 can be separate components, the same component, and/or part of a component 455. The price component 445 can utilize $list_N$ to compute a profit maximizing $price_N$ for $list_N$ as depicted at 460, and the price component 450 can utilize $list_M$ to compute a profit maximizing $price_M$ for $list_M$ as depicted at 465. $List_N$ and $price_M$ can be utilized by an allocation component 470 to allocate the items associated with the $List_N$ to the bidders associated with the bids and budgets within $List_N$, as depicted at 475. $List_M$ and $price_N$ can be utilized by an allocation component 480 to allocate the items associated with the $List_M$ to the bidders associated with the bids and budgets within $List_M$, as depicted at 485. It is to be appreciated that the allocation components 470 and 480 can be separate components, the same component, and/or part of a component 490.

Figure 5:
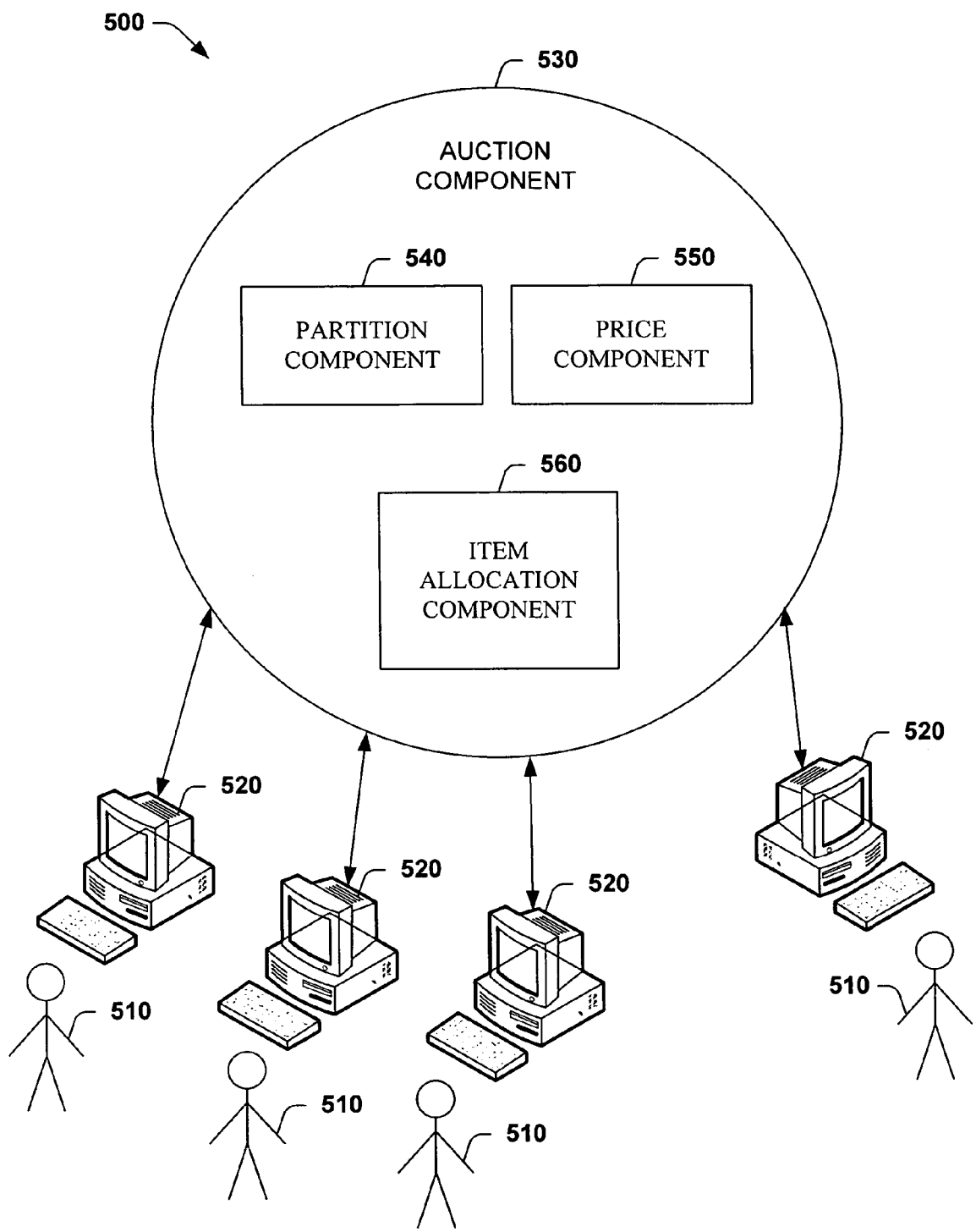
FIG. 5 illustrates an exemplary auction system.

FIG. 5 illustrates an exemplary auction system 500. A plurality of users 510 can employ computing devices 520 to participate in an auction. Although depicted as computers, the computing devices 520 can be essentially any microprocessor based devices. For example, at least one of the computing devices 520 can be a laptop, a PDA, a cell phone, workstation, a beeper, etc. As such, the computing devices 520 can support wire and/or wireless technologies and include various input (e.g., mouse, keyboard, voice, touch screen . . . ) and output (e.g., monitor, audio . . . ) components. The input and output components and the transmission line can be utilized by the computing devices 520 to interact with an auction component 530.

The auction component 530 can be utilized to facilitate an auction amongst the plurality of users 510. In one instance, the auction component 530 can be utilized in connection with an online auctioning service. In another instance, the auction component 530 can be utilized in connection with an auction server, wherein the computing devices 520 can be clients within the server's network. In yet another instance, separate instances of the auction component 530 can execute within each of the computing devices 520. In still another instance, the auction component 530 can be distributed across computing devices 520, networks and/or other networked components. In other instances, the auction component 530 be stored in on a storage medium such as, but not limited to, local memory (e.g., cache, RAM, hard disk . . . ), portable memory (e.g., CompantFlash, memory stick, CD, DVD, Optical Disk, Tape . . . ), and/or remote memory (e.g., a server, a database, a different computing system, a web site, an FTP site . . . ).

The plurality of users 510 can independently utilize the computing devices 520 to submit private bids and budgets to the auction component 530. The information can be aggregated and provided to a partition component 540 ("list generator"). As noted above, such aggregation can be random (e.g., based on a uniform, Gaussian or other algorithm) or structured (e.g., in an ascending, descending or other order). The list generator 540 can create one or more groups of bids and budgets from the aggregated list. For example, the partition component 540 can split the aggregated list into two equally sized groups as described in connection with FIG. 4. In another example, more or less than two groups can be generated, and such groups can be equal or unequal in size. The groups created from the aggregated list can be reordered as described herein. The partition component 540 can convey the reordered groups to a price component 550, which can compute corresponding profit maximizing prices there from. The profit maximizing prices and the one or more groups can be conveyed to an item allocation component 560, which can utilize this information to allocate auctioned items to the pluralities of users 510.

Figure 6:
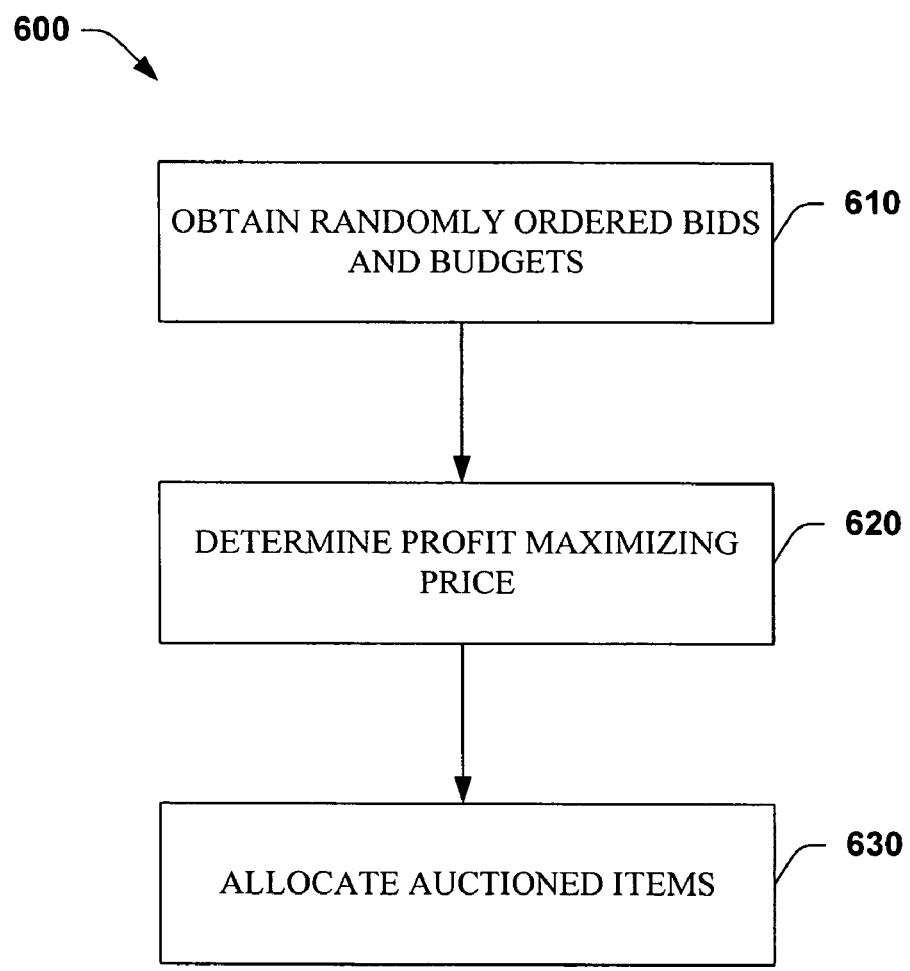
FIG. 6 illustrates an exemplary method for allocating items in an auction to bidders based at least in part on a revenue maximizing price.
Figure 7:
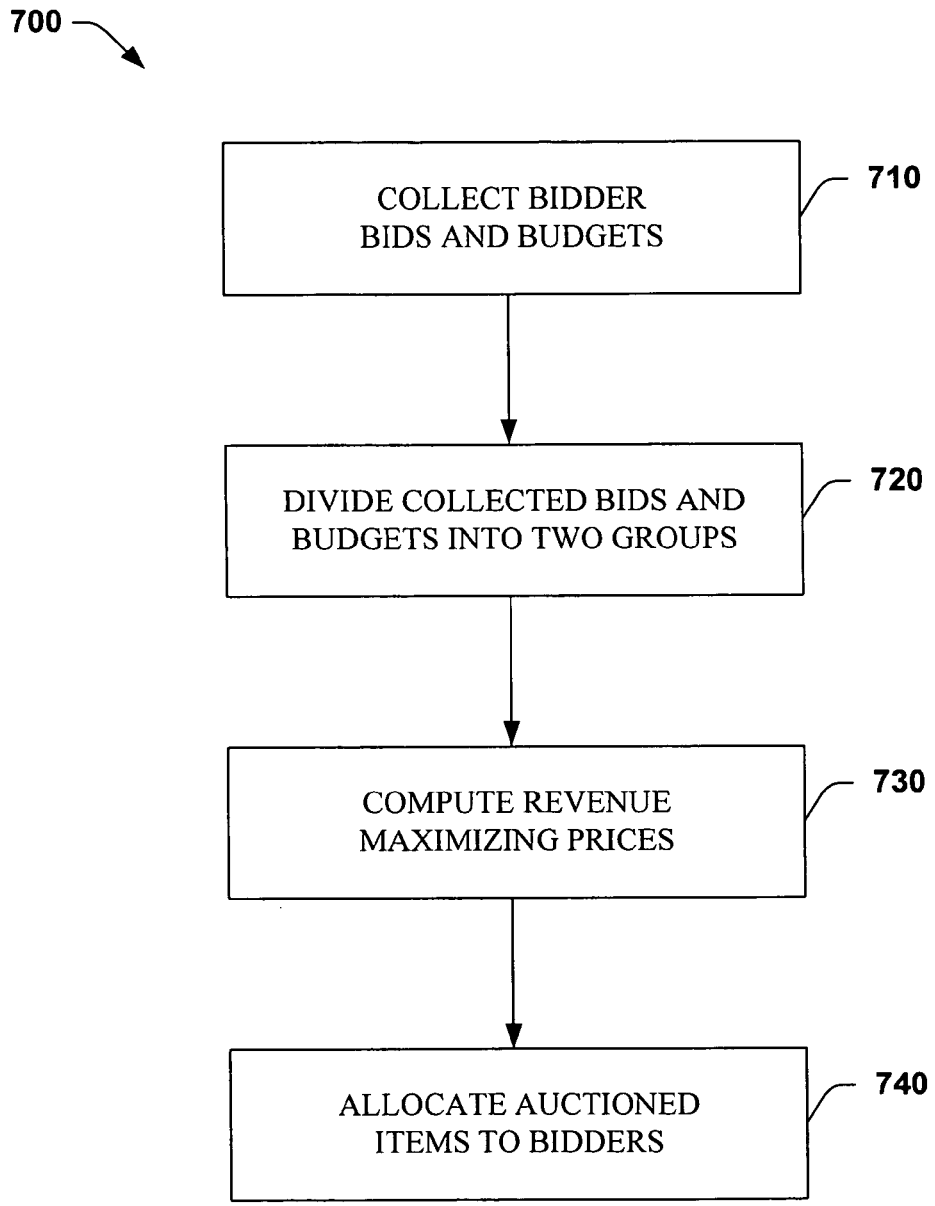
FIG. 7 illustrates an exemplary method that facilitates allocating one or more auctioned items in a multi-unit auction.
Figure 8:
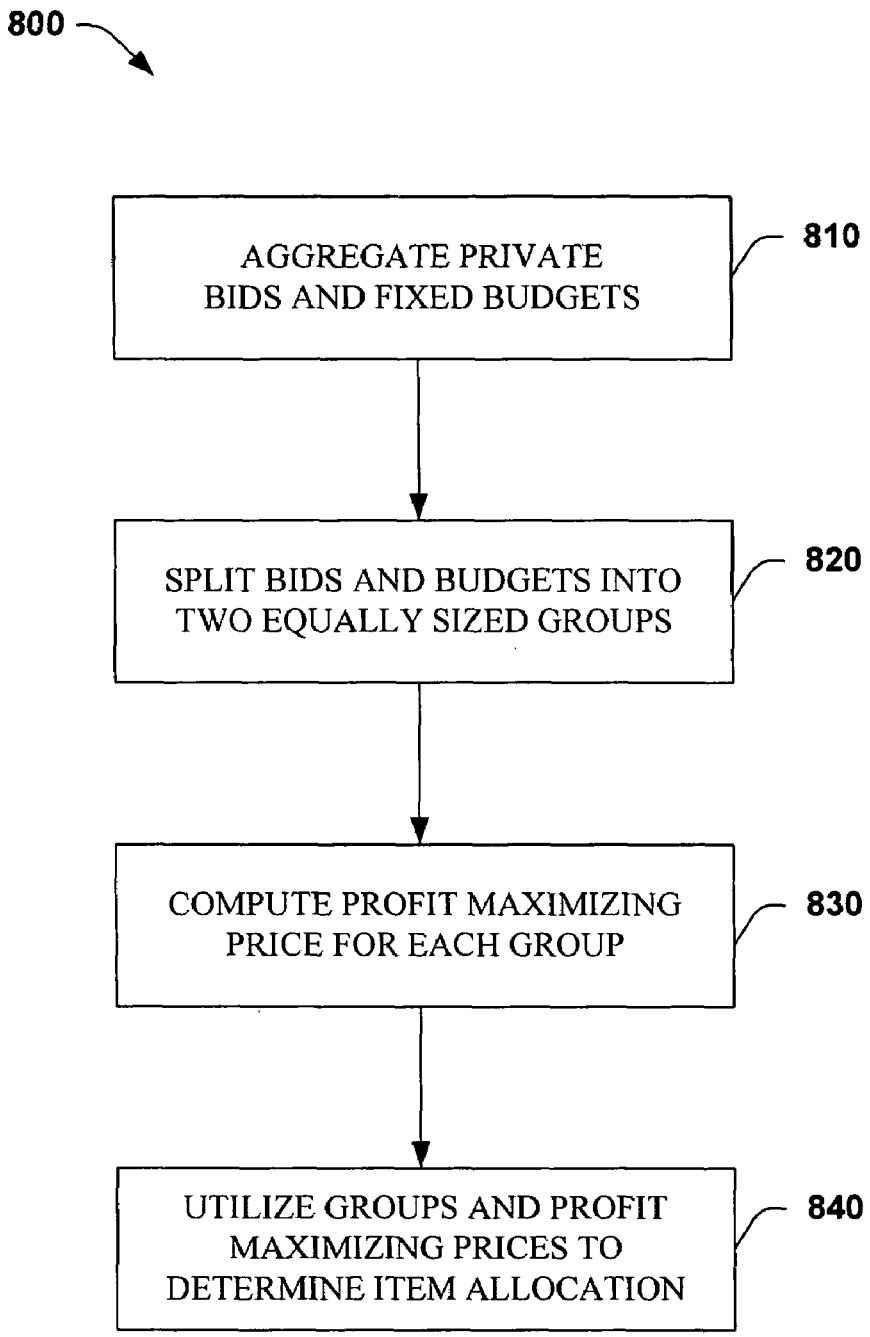
FIG. 8 illustrates an exemplary method for implementing a two-list technique that utilizes private bids and budgets to facilitate allocating one or more auctioned items.

FIGS. 6-8 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 6 illustrates a method 600 for allocating items in an auction to bidders based at least in part on a revenue maximizing price. At reference numeral 610, randomly ordered private bids and fixed bidder budgets for an item being auctioned are obtained. These bids and budgets can be generated from a superset of randomly ordered bids and bidder budgets and reordered. The superset can be obtained by aggregating actual user bids for items being auctioned. At 620, the randomly ordered private bids and fixed bidder budgets can be utilized to compute profit maximizing prices. In general, a profit maximizing price is computed for subsets of the bids and budgets based at least in part on that subset. In other instances, bidder, seller and/or item characteristics, time of day, day of year, etc. are additionally and/or alternatively utilized to compute respective profit maximizing prices. At reference numeral 630, the profit maximizing prices and the subset of bids and budgets can be utilized to allocate the auctioned items to the bidders.

FIG. 7 illustrates a method 700 that facilitates allocating one or more auctioned items in a multi-unit auction. At reference numeral 710, user private bid and fixed budget information is collected. It is to be appreciated that the order of the one or more private bids and budgets are collected can be random, ascending (e.g., based on relative magnitude, time received, bidder characteristics . . . ), descending (e.g., based on relative magnitude, time received, bidder characteristics . . . ), etc. In addition, various algorithms can be utilized to affect the ordering. For example, a uniform or Gaussian algorithm or an algorithm based on another distribution can be utilized to generate a randomly ordered list of bids and budgets. At 720, the collected information is split into at least two groups of bids and budgets. Upon generating these groups, they can be randomly reordered. Similar to the initial collection of bids and budgets, reordering can be achieved via random or non-random techniques. At 730, the reordered groups are utilized to compute a profit maximizing price for each group. At reference numeral 740, the profit maximizing prices and groups of bids and budgets can be utilized to allocate the auctioned items to the bidders.

FIG. 8 illustrates a method 800 for implementing a two-list technique that utilizes private bids and budgets to facilitate allocating one or more auctioned items. At reference numeral 810, one or more private bids for an auctioned item are aggregated. The aggregated set of private bids can be randomly ordered as described above. Associated with each aggregated bid is a private fixed budget for the bidder submitting the bid. At 820, the aggregation of randomly ordered private bids and associated private fixed budgets can be split into groups. Such groups can be created to include an equal number of bids to generate equal sized groups. It is to be appreciated that in one instance, the aggregated set is simply split in half, while in other instances other techniques can be utilized to generate the two equal sized sets. At reference numeral 830, each list is utilized to determine a profit maximizing price based at least in part on that list. At 840, the profit maximizing price for one set of bids and budgets and the other set of bids and budgets can be utilized to determine a suitable allocation for the items associated with the bids. Likewise, the remaining profit maximizing price and set of bids and budgets can be utilized to determine a suitable allocation for the items associated with the bids.

Figure 9:
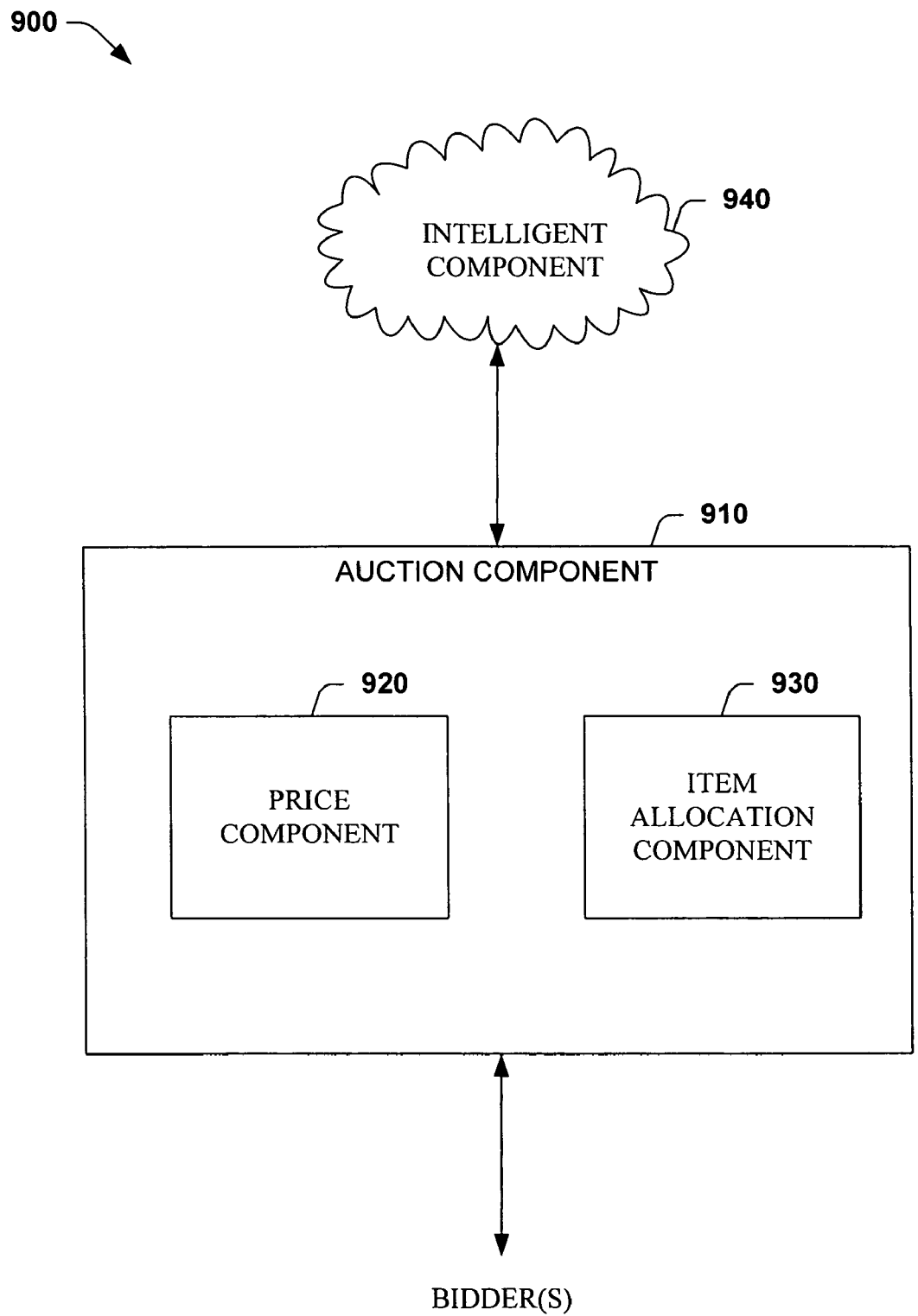
FIG. 9 illustrates an exemplary system that employs intelligence to facilitate allocating auctioned items to bidders based at least in part on bidder private bids and private fixed budgets.

FIG. 9 illustrates a system 900 that employs intelligence to facilitate allocating auctioned items to bidders based at least in part on bidder private bids and private fixed budgets. A plurality of users can participate in an auction facilitated by the auction component 910. As described previously, the plurality of users can employ various microprocessor based devices to interact with the auction component 910. The auction component 910 can be utilized in connection with an online or other auctioning service. The plurality of users can independently submit private bids and fixed budgets to the auction component 910, wherein this information can be randomly aggregated. The random list can be split into two equally sized lists, wherein the two lists can be randomly reordered as described herein. The reordered lists can be conveyed to a price component 920, which can compute a profit maximizing price there from. The profit maximizing price and the one or more list can be conveyed to an allocation component 930, which can utilize this information to allocate auctioned items to the pluralities of users.

The system 900 further includes an intelligent component 940 that can be utilized to facilitate allocating the auctioned items. For example, the intelligent component 940 can facilitate randomly aggregating received bids along with associated budget information. In addition, the intelligent component 940 can be utilized to facilitate splitting the aggregated list into two lists and reordering each list. Furthermore, the intelligent component 940 can be utilized in connection with the price component 920 to compute profit maximizing prices. Moreover, the intelligent component 940 can be utilized in connection with the allocation component 930 to allocate auctioned items to the plurality of users.

It is to be understood that the intelligent component 940 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 10:
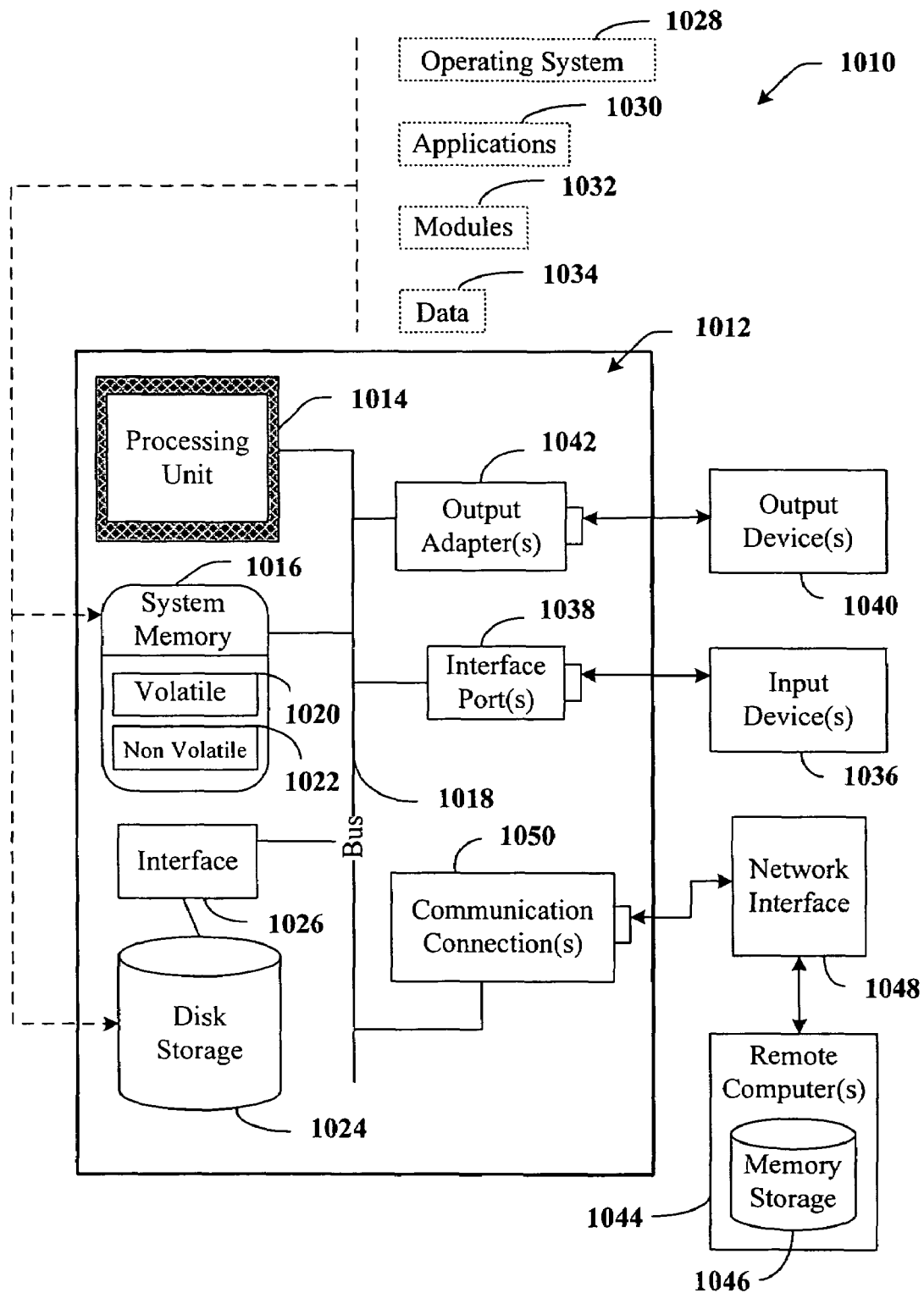
FIG. 10 illustrates an exemplary computing architecture that can be employed in connection with the subject invention.
Figure 11:
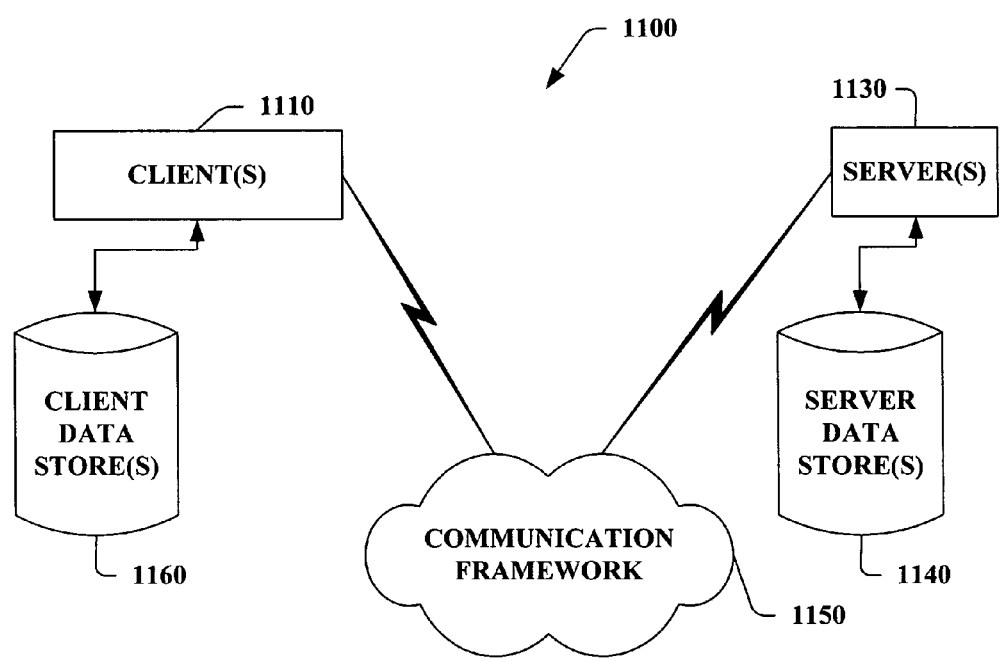
FIG. 11 illustrates an exemplary networking environment that can be employed in connection with the subject invention.

In order to provide a context for the various aspects of the invention, FIGS. 10 and 11 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects of the invention includes a computer 1012. The computer 1012 includes a processing unit 1014, a system memory 1016, and a system bus 1018.

The system bus 1018 couples system components including, but not limited to, the system memory 1016 to the processing unit 1014. The processing unit 1014 can be any of various available processors. Dual microprocessors and other multi-processor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 10-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and Rambus Direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 can be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

APPENDIX A

Appendix A illustrates various approaches that facilitate implementing the invention described herein. In addition, Appendix A illustrates various lemmas, theorems and corollaries, and respective proofs in accordance with the subject invention. It is to be appreciated that these approaches, lemmas, theorems, corollaries, respective proofs are provided for explanatory purposes and does not limit the subject invention.

The mechanisms utilized herein may allocate only some of the goods (items, commodities, services, etc.), and among them, seek the one that maximizes expected revenue. This can be achieved by designing a mechanism that has revenue comparable to a best omniscient posted-price auction. With this technique, a competitive ratio defined to be the expected revenue determined by this mechanism over the revenue of the optimum posted-price auction can be obtained and utilized to design an auction which minimizes this ratio. Unlike conventional auction approaches, the technique described herein can allocate more than one good to every bidder (agent, participant, etc.). Moreover, bidders can lie about both their bid and their budget. A budget dominance parameter can be defined for each bidder, wherein the parameter is computed as the ratio of the bidder's budget to the revenue of the optimum posted-price auction. The budget dominance parameter is the maximum of the budget parameter of all the bidders, wherein the competitive ratio approaches one as the budget dominance parameter approaches zero.

The following provides a detailed description of an algorithm that can be utilized with this technique. Let n be the number of bidders and m be the number of indivisible goods (e.g., items, commodities . . . ). Each bidder i submits a utility value for one item $u_i$ and a maximum budget $b_i$. Although such goods can be indivisible, fractional allocations are possible by using a suitable randomization, for example, whenever the algorithm asks to allocate a fraction c of a good to a bidder, a full good can be allocated with probability c. The algorithm can be defined by the following:

Partition the bidders randomly into two sets A and B by independently putting each bidder into either set uniformly at random with probability ½, and From the set of utility values $u_i$ of bidders i∈A, choose $p_A$ to be the price that maximizes the revenue of selling at most m/2 items in A. In other words, if the $u_i$'s are sorted in a decreasing order, for $$i_0 = \min_i \sum_{j=1}^{i-1} b_j \geq \frac{u_i m}{2},$$

define $p_A = U_{i_0-1}$. Compute $p_B$ analogously.

Consider the bidders in A in a random order. In every step, if the utility of bidder i satisfies $u_i \geq p_B$, then allocate $$\frac{b_i}{p_B}$$

goods to i. Continue this process until all $$\frac{m}{2}$$

goods have been allocated, or until all the bidders in A have been processed. Apply the same procedure to the set B using the threshold value $p_A$.

The following analyzes the above algorithm and proves that it is truthful and that its competitive ratio approaches one as the budget dominance parameter approaches zero. In this analysis, it is assumed without loss of generality that items such as goods are divisible. As explained above, this assumption can be easily removed by a few additional coin flips. The following is a proof of the truthfulness of the algorithm.

Lemma 1. The above algorithm is truthful, for example, for every agent reporting the correct utility and budget values, the algorithm is a dominant strategy. Proof. Consider an agent i in A, where the agent i does not have any incentive to misreport utility. Agent i receives a good only if $u_i \geq p_B$, and pays $p_B$ for the good. At least two observations can be drawn: (1) the threshold $p_B$ is determined independently of all $u_j$ and $b_j$, including j=i; and (2) when the supply of goods in A is inadequate to meet the demands of all agents in A whose utilities exceed $p_B$, then the allocation of goods to those agents is done in an arbitrary order, independently of all $u_j$ and $b_j$. By reporting a budget below $b_i$, agent i would potentially decrease allocation and hence total utility, whereas by reporting a budget above $b_i$, agent i has non-zero probability of decreasing total utility to negative infinity. In either case, agent i has no incentive to misreport.

The rest of this section is an analysis of the revenue achieved by this algorithm. For notational convenience, without loss of generality, it is assumed that $u_1 > u_2 > \ldots > u_n$. For any price p, $r_S(P, k)$ is the revenue of allocating at most k goods to a set S of agents at price p:

$$r_S(p, k) = \min\left(kp, \sum_{\substack{j \in S \\ u_j \geq p}} b_j\right).$$

The notation r(p, k) in the case where we are allocating the goods to the whole set A∪B will be utilized herein, wherein r(p) is defined as: $r(p) = r(p, \infty) = \Sigma_{u_i \geq p} b_i$. Given the utility and budget values of the agents, the optimum price p* at which r(p, m) is maximized can be determined, and goods can be allocated at this price. This mechanism is referred to herein as the optimum posted-price auction, or OPT=r(p*, m). The following are properties of an optimum posted-price auction for allocating at most k goods, for any k.

1. There exists an agent i such that selling the goods at price $p=u_i$ results in the optimum revenue; and 2. For any k, if p is the optimum price for allocating at most k goods, then $r(p, k) \leq r(p) = r(p) + b_{max}$ where $b_{max} = \max_i b_i$. In particular, $$\text{OPT} \leq r(p^*) \leq \text{OPT} + b_{max}.$$

Let ε denote the ratio of the maximum budget of all agents, $b_{max}$, to the value of the optimum solution OPT. In some sense, ε is a budget dominance parameter since it captures the extent to which the budget of a single agent dominates the market in the optimum solution. As illustrated, the probability of success of this algorithm is asymptotically controlled by ε.

Lemma 2. Let $\delta>0$. Then the probability that $$|r_A(u_l) - r_B(u_l)| < \delta OPT \text{ for all } l \text{ with } u_l \leq p^*$$

is at least $1 - 2e^{-\delta^2/(4\epsilon)}$.

Proof. Let k be such that $u_k = p^*$. Define $\alpha_i$ to be a random variable indicating whether agent i is in A, with $\alpha_i = 1$ when $i \in A$ and $\alpha_i = -1$ when $i \in B$. Let $S_i = \Sigma_{j \leq i} \alpha_j b_j$. Then $|r_A(u_l) - r_B(u_l)| = |S_l|$. Thus, the probability that the random variable $S_i$ deviates by more than $\delta OPT$ from its expectation 0 needs to be bounded. Let $\tau(\delta) = \min_i\{|S_i| \geq \delta OPT\}$. We define the following martingale:

$$\tilde{S}_i = \begin{cases} S_i & \text{if } i \leq \tau(\delta) \\ S_{\tau(\delta)} & \text{otherwise} \end{cases}$$

Then we have $$1 - Pr(|r_A(u_i) - r_B(u_i)| < \delta OPT, \forall i \leq k) = 1 - Pr(|S_i| < \delta OPT, \forall i \leq k)$$
$$= Pr(\exists i \leq k : |S_i| \geq \delta OPT)$$
$$= Pr(\tau(\delta) \leq k)$$
$$= Pr(|\tilde{S}_i| \geq \delta OPT)$$

Now since $\tilde{S}_i$ is a martingale, by the Azuma-Hoeffding inequality we have:

$$Pr(|\tilde{S}_k| \geq \delta OPT) \leq 2\exp\left(\frac{-\delta^2 OPT^2}{2\sum_{i \leq k} b_i^2}\right).$$

Bounding the sum $\Sigma_{i \leq k} b_i^2$ by $b_{max} r(p^*) \leq \epsilon OPT r(p^*)$ and using that $r(p^*) \leq OPT(1+\epsilon) \leq 2OPT$, the following lemma is obtained.

For the following, a event happens with high probability if its probability is at least $1 - 2e^{-\delta^2/(4\epsilon)}$.

Corollary 1. With high probability, $$r_A\left(p^*, \frac{m}{2}\right) \geq \frac{1-\delta}{2} OPT.$$

Proof. Let $OPT = r(p^*, m) = \min\{p^*m, r(p^*)\}$, implying that $mp^* \geq OPT$ and $r(p^*) \geq OPT$. With the help of Lemma 2, it can be concluded that with high probability, $$r_A(p^*) \geq \frac{1-\delta}{2} r(p^*) \geq \frac{1-\delta}{2} OPT.$$

Inserting the definition of $$r_A\left(p^*, \frac{m}{2}\right)$$

and using $$\frac{m}{2} p^* \geq OPT$$

the lemma is obtained.

Corollary 2. With high probability, we have that $$r_B(u_k) \geq \min\left\{r_A(u_k) - \delta OPT, \frac{1-\delta}{2} OPT\right\} \text{ for all } k.$$

Proof.
From Lemma 2, with high probability, $$r_B(u_k) \geq r_A(u_k) - \delta OPT \text{ for all } k \text{ with } u_k \leq p^*.$$

Since $r_A(p^*) + r_B(p^*) = r(p^*) \geq OPT$, it can be concluded that with high probability, both the above and $$r_B(p^*) \geq \frac{1-\delta}{2} OPT$$

hold simultaneously. By monotonicity, this implies the statement of the lemma. Indeed, either $u_k \leq p^*$ so that $r_B(u_k) \geq r_A(u_k) - \delta OPT$, or $u_k \geq p^*$ and $$r_B(u_k) \geq r_B(p^*) \geq \frac{1-\delta}{2} OPT,$$

which gives the lemma.

Theorem 2. The mechanism described in the previous section is truthful. Furthermore, for all $0 < \delta < 1$, the algorithm has revenue at least $(1-\delta)OPT$ with probability $1 - O(e^{-c\delta^2/\epsilon})$ with $c = 1/36$ and $\epsilon = b_{max}/OPT$.

Proof. For all p, $$r_A\left(p, \frac{m}{2}\right) \leq r_A\left(p_A, \frac{m}{2}\right),$$

so in particular $$r_A\left(p_A, \frac{m}{2}\right) \geq r_A\left(p^*, \frac{m}{2}\right).$$

Combined with the last corollary, it is concluded that with high probability, $$r_A\left(p_A, \frac{m}{2}\right) \geq \frac{1-\delta}{2} OPT,$$

which in turn implies that $$p_A \frac{m}{2} \geq \frac{1-\delta}{2} OPT$$

and $$r_A(p_A) \geq \frac{1-\delta}{2} OPT.$$

Combined with Corollary 2, the last inequality gives $$r_B(p_A) \geq \frac{1-3\delta}{2} OPT,$$

with high probability. Inserting the definition of $$r_B\left(p_A, \frac{m}{2}\right),$$

with high probability, $$r_B\left(p_A, \frac{m}{2}\right) \geq \frac{1-3\delta}{2} OPT.$$

Exchanging the roles of A and B, the same result for $$r_A\left(p_B, \frac{m}{2}\right)$$

can be obtained. Since $$r_B\left(p_A, \frac{m}{2}\right) + r_A\left(p_B, \frac{m}{2}\right)$$

is the revenue of the algorithm, this establishes the theorem.

The following describes a setting in which an auctioneer has several indivisible units of a single good (or item, commodity, service . . . ) to auction off to n interested agents. Each agent i has a private utility $u_i \in \mathfrak{R}_+$ per unit of the good and a private budget constraint $b_i \in \mathfrak{R}_+$. Vectors $(u_1, \ldots, u_{i-1}, u_{i+1}, \ldots, u_n)$ and $(b_1, \ldots, b_{i-1}, b_{i+1}, \ldots, b_n)$ are respectively denoted by $u_{-i}$ and $b_{-i}$. The budget constraint is a hard constraint in that the agent cannot spend more than the budget under any circumstances. In other words, the total utility $u_i(j, p)$ that agent i derives from an allocation of j units at a total price of p is:

$$u_i(j, p) = \begin{cases} ju_i - p & \text{if } p \leq b^i, \\ -\infty & \text{if } p > b^i. \end{cases}$$

The value $-\infty$ in the above definition means that this agent prefers receiving no item and paying nothing to any lottery with a non-zero risk of going over the budget.

An auction mechanism can solicit a two-parameter bid from each agent. The first parameter can be that agent's announced utility per unit and the second parameter is that agent's announced budget. The mechanism then outputs an allocation and payment for each agent. Such mechanisms can satisfy at least one of the following properties:

observe supply limits—the mechanism never allocates more units than are available;

individual rationality—an agent's utility from participating in the mechanism is non-negative; and incentive compatibility or truthfulness—an agent's total utility is maximized by announcing true utility and budget to the auction regardless of the strategies of the other agents.

These properties can be generalized for randomized mechanisms by replacing utility by expected utility. An auction mechanism satisfying the above properties is referred to herein as a truthful mechanism. It is to be understood that individual rationality and the definition of utility functions imply that a truthful mechanism never charges an agent an amount more than her budget.

A distinction of the above setting compared to conventional auction theory models is that in the novel invention described herein, the agents' utility functions are not quasi-linear. A quasi-linear utility function is a utility function of the form u(x)−p, where u(x) is a function that only depends on the allocation and not on the payments, and p is the amount charged to the agent. The utility function $u_i(j, p)$ defined above cannot be written in this form. This makes much of the results in the auction theory inapplicable to our setting. In particular, the classical Vickrey-Clarke-Groves (VCG) mechanisms are not incentive compatible in our setting. This following example illustrated this point.

A natural mechanism for auctioning m units of a good to budget-constrained buyers is to apply the VCG mechanism assuming that the utility of agent i for j units of the good is $\min(b_i, ju_i)$. A common mistake is to assume that since this mechanism is based on VCG, it is truthful. The following example shows that this is not the case: assume two units of a good to sell to two agents, and bids of these agents are given by $(u_1, b_1) = (10,10)$ and $(u_2, b_2) = (1,10)$. The above mechanism assumes that the utility of the first agent for one unit of the good is 10, and therefore allocates one unit to each agent to maximize the total utility (which is 10+1). The payment charged to the agents by this mechanism is 1 and 0. Therefore, the utility of the first agent is 9. However, if the first agent announces the bid (5,10), then the mechanism will allocate both items to this agent at a total price of 2. Thus, the first agent would achieve a utility of 18 by bidding untruthfully. This example shows that the above VCG-based mechanism is not truthful even if the agents are not allowed to lie about their budget.

It is easy to observe that with the invention described herein, no truthful mechanism can always produce an efficient allocation, or an allocation that maximizes the social welfare, even when there is only one good. The reason for this is that an efficient mechanism should always allocate the good to the bidder with the highest $u_i$, even if such a bidder has a zero budget and therefore cannot be charged any positive amount. Therefore, any agent can bid a high utility and zero budget to get the item for free. This simple impossibility result shows that efficiency cannot be required from a truthful mechanism.

The following provides a price-based characterization of truthful auctions. It essentially describes that any truthful auction determines the allocation and price for agent i by comparing his bid to thresholds computed from the other agents' bids. The unconstrained budgets version of this proposition is a well-known folklore theorem.

Proposition 1. For any truthful auction selling m units of a good to n agents, there exist mn functions $p_i^1, \ldots, p_i^m$: $\Re_+^{2(n-1)} \to \Re_+ \cup \{\infty\}$ such that agent i receives j units at price $p_i^j(u_{-i}, b_{-i})$ where j maximizes $ju_i - p_i^j(u_{-i}, b_{-i})$ subject to $p_i^j(u_{-i}, b_{-i}) \leq b_i$. Proof. For any $(u_{-i}, b_{-i}) \in \Re_+^{2(n-1)}$ and $j \in \{1, \ldots, m\}$, we define $p_i^j(u_{-i}, b_{-i})$ as the minimum, over the choice of $(u_i, b_i)$ such that the auction allocates at least j items to i if agents bid (u, b), of the price that the mechanism charges to i at these bids. Let j* be an index that maximizes $j^*u_i - p_i^{j^*}(u_{-i}, b_{-i})$ subject to $p_i^{j^*}(u_{-i}, b_{-i}) \leq b_i$. If when agents bid (u, b), the mechanism allocates j units to i at price p, then we must have $ju_i - p = j^*u_i - p_i^{j^*}(u_{-i}, b_{-i})$, since otherwise agent i would have an incentive to bid untruthfully to get j* items at price $p_i^{j^*}(u_{-i}, b_{-i})$.

By considering all cases for the relationship between the $p_i^j$'s, the auction can be expressed as a concise set of inequalities. This is done for the case of two units of good and two buyers in the following corollary. The foregoing will be used next as a corollary to prove that truthful mechanisms satisfying certain properties do not exist.

Corollary 1. For any deterministic truthful auction selling 2 units of a good to 2 agents, there exist threshold functions $p_i^j$: $\Re_+^2 \to \Re \cup \{\infty\}$, $1 \leq i, j \leq 2$, such that for i=1, 2, the agent i receives 2 units at a total price of $p_i^2(u_{3-i}, b_{3-i})$ if $b_i \geq p_i^2(u_{3-i}, b_{3-i})$ and $u_i > p_i^2(u_{3-i}, b_{3-i}) - \min(p_i^1(u_{3-i}, b_{3-i}), p_i^2(u_{3-i}, b_{3-i})/2)$ (or if the latter inequality holds with equality, the mechanism can choose to allocate 2 units to i);

else 1 unit at price $p_i^1(u_{3-i}, b_{3-i})$ if $b_i \geq p_i^1(u_{3-i}, b_{3-i})$ and $u_i > p_i^1(u_{3-i}, b_{3-i})$ (or if the latter inequality holds with equality, the mechanism can choose to allocate 1 units to i);

else 0 units.

Conversely, for any set of threshold function $p_i^j$: $\Re_+^2 \to \Re_+ \cup \{\infty\}$, $1 \leq i, j \leq 2$, the mechanism defined above satisfies incentive compatibility and individual rationality. Proof. We prove the statement for i=1 (i=2 is analogous). Consider the threshold functions given by Proposition 1. Fix any bid $(u_2, b_2)$ of the second agent. Suppose the true utility and budget of the first agent is $u_1$ and $b_1$, respectively. For simplicity, we use the notation $p_1^1 := p_1^1(u_2, b_2)$ and $p_1^2 := p_1^2(u_2, b_2)$. Notice that by the definition of $p_1^1$ and $p_1^2$ in the proof of Proposition 1, $p_1^1 \leq p_1^2$. The first agent's utility for an allocation of 0 units is 0, 1 unit is $u_1 - p_1^1$ assuming $b_1 \geq p_1^1$, and 2 units is $2u_1 - p_1^2$ assuming $b_1 \geq p_1^2$. The first agent receives two units if and only if the agents has enough budget to pay for it (i.e., $b_1 \geq p_1^2$), and the agent's utility for receiving two items $(2u_1 - p_1^2)$ is greater than or equal to her utility for receiving one item $(u_1 - p_1^1)$ and zero item (zero). This can be written as $u_1 \geq p_1^2 - p_1^1$ and $u_1 \geq p_1^2/2$, or equivalently, $u_1 \geq p_1^2 - \min(p_1^1, p_1^2/2)$. Otherwise, if the first agent does not receive two items, then the agent receives one item if and only if the agent has the budget (i.e., $b_1 \geq p_1^1$), and the agent's utility for one item $(u_1 - p_1^1)$ is greater than or equal to the agent's utility for zero items, or equivalently, $u_1 \geq p_1^1$. If these conditions do not hold, then the agent receives zero units. The converse follows easily from the definition of the mechanism.

What has been described above includes examples of the present invention. It is not possible to describe every conceivable combination of components or methodologies for purposes of describing the present invention, but one of ordinary skill in the art may recognize that many further combinations and permutations of the present invention are possible. Accordingly, the invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application.

What is claimed is:

1. A system comprising:
   one or more processors that execute the following computer executable components stored on at least one computer readable medium;
   an auction component that receives, from each bidder of a set of bidders, a private bid and a private fixed budget associated with one or more items auctioned in a multi-unit auction;
   a partition component that randomly separates the set of bidders into two sets of bidders, with a probability of 0.5;
   a pricing component that asymptotically computes a profit maximizing price for each of the two sets of bidders, each price is determined by a component that maximizes revenue as a function of private bids and private fixed budgets associated with its set of bidders based on, at least in part, the following function:

$$i_o = \min_i \sum_{j=1}^{i-1} b_j \geq \frac{u_i m}{2}$$

wherein $b_i$ is the maximum budget submitted by a bidder i;
   $u_i$ is the utility value for one item, submitted by the bidder i; and
   m is the number of indivisible items being auctioned; and
   an allocation component that utilizes the profit maximizing price associated with a set of bidders of the two sets of bidders with an other set of bidders of the two sets of bidders to allocate auctioned items to the set of bidders.

2. The system of claim 1, wherein the partition component utilizes a uniform algorithm or a Gaussian algorithm to randomly separate the set of bidders.

3. The system of claim 1, wherein an online auction that utilizes to facilitate auctioning items.

4. The system of claim 3, wherein the auctioned items include online advertisements for search terms and content pages associated with search engines.

5. The system of claim 1, wherein the pricing component further utilizes a truthful algorithm to determine the revenue maximizing prices.

6. The system of claim 1, wherein individual bidders are associated with a linear, quasi-linear or non-linear utility.

7. The system of claim 1, the asymptotically computing comprises:
maximizing revenue as a function of private bids and private fixed budgets.

8. The system of claim 7, the maximizing is based on, at least in part, a product of one-half of a utility value for one item submitted by each bidder and a number of indivisible items being auctioned in the multi-unit auction.

9. A computer readable storage medium having stored thereon computer executable instructions for performing the following acts:
randomly separating a set of bidders into two sets of bidders with associated bids and budgets with a probability of 0.5, wherein the bids and budgets relate to one or more auctioned items;
determining a revenue maximizing price for each the two sets of bidders by asymptotic computation, each price is determined by a component that maximizes revenue as a function of private bids and private fixed budgets associated with its set of bidders, based on, at least in part, the following function:

$$i_o = \min_i \sum_{j=1}^{i-1} b_j \geq \frac{u_i m}{2}$$

wherein $b_i$ is the maximum budget submitted by a bidder i;
$u_i$ is the utility value for one item, submitted by the bidder i; and
m is the number of indivisible items being auctioned; and
allocating the one or more auctioned items to one of the two sets of bidders based on the revenue maximizing price of the other one of the two sets of bidders.

10. The computer readable storage medium of claim 9, further comprising utilizing a truthful algorithm to allocate auctioned items.

11. The computer readable storage medium of claim 9, further comprising receiving bids for online advertisements for search terms and content pages associated with search engines.

12. The computer readable storage medium of claim 9, the determining comprises:
asymptotically computing the revenue maximizing prices for each set of bidders.

13. A system comprising:
at least one processor that executes the following computer executable components stored on at least one computer readable medium;
an auction component that receives a private bid and a private budget from each bidder of a plurality of bidders, the private bid and private budget of each bidder associated with one or more items auctioned in a multi-unit auction;
a partition component that randomly separates the plurality of bidders into two sets of bidders, with a probability of 0.5;
a pricing component that asymptotically computes respective profit maximizing prices for the two sets of bidders, each price is determined by a component that maximizes revenue as a function of private bids and private fixed budgets associated with its set of bidders, based on, at least in part, the following function:

$$i_o = \min_i \sum_{j=1}^{i-1} b_j \geq \frac{u_i m}{2}$$

wherein $b_i$ is the maximum budget submitted by a bidder i;
$u_i$ is the utility value for one item, submitted by the bidder i; and
m is the number of indivisible items being auctioned; and
an allocation component that utilizes the profit maximizing price associated with one set of bidders with the other set of bidders to allocate auctioned items to the other set of bidders.

* * * * *